K. H. JOHANSSON.
AUTOMATIC LOCKING DEVICE FOR THE MOVABLE MEMBERS OF FRICTION CLUTCH COUPLINGS.
APPLICATION FILED JULY 1, 1918.
1,284,900.
Patented Nov. 12, 1918.
2 SHEETS—SHEET 1.
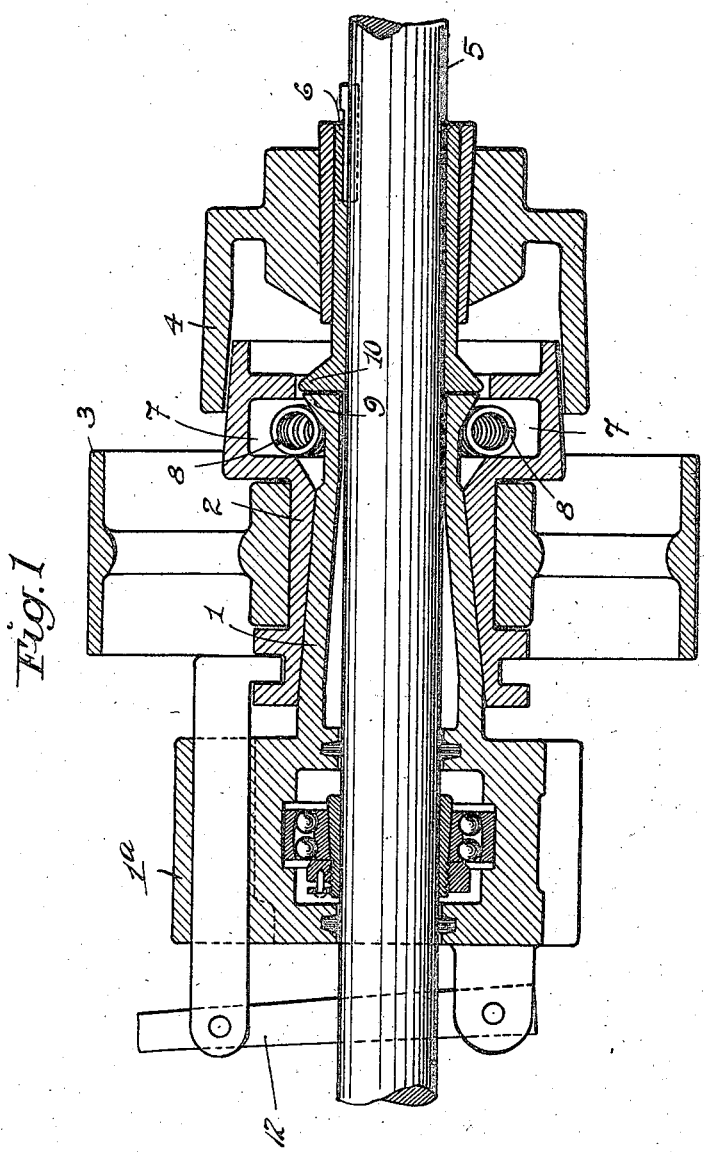
Inventor
K. H. Johansson,
By L. R. Kerslake
Atty.

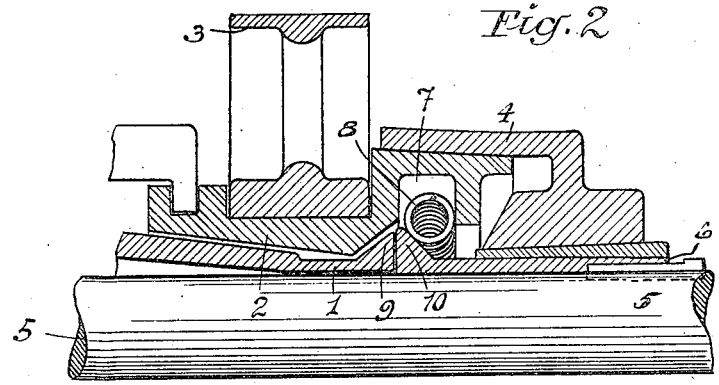
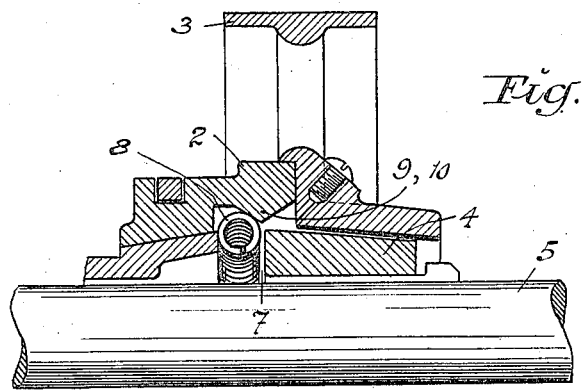
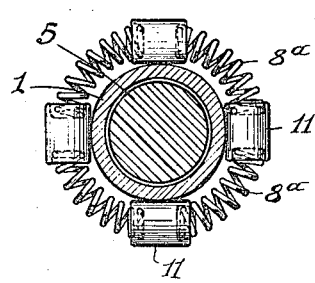

UNITED STATES PATENT OFFICE.

KLAS HERMAN JOHANSSON, OF NÄSSJÖ, SWEDEN.

AUTOMATIC LOCKING DEVICE FOR THE MOVABLE MEMBERS OF FRICTION-CLUTCH COUPLINGS.

1,284,900.

Specification of Letters Patent.   Patented Nov. 12, 1918.

Application filed July 1, 1918. Serial No. 242,949.

*To all whom it may concern:*

Be it known that I, KLAS HERMAN JOHANSSON, a subject of the King of Sweden, residing at Nässjö, in the Kingdom of Sweden, have invented certain new and useful Improvements in Automatic Locking Devices for the Movable Members of Friction-Clutch Couplings, of which the following is a specification.

My present invention has for its object an automatic locking device for the movable part of such clutch couplings as are provided with a movable part adapted to be displaced along the shaft for being connected either with a coupling member fixed on the shaft or with a coupling member on the stationary bearing block.

The invention is chiefly characterized by the fact that there is located, between the displaceable clutch part and the stationary part or parts, an elastic device which is adapted to coöperate with an abutment formed by two conical surfaces inclined toward each other in such a manner that the elastic device in the end or coupling positions of the movable part rests directly or indirectly against either of said conical surfaces thereby locking the same in said coupling positions, and that on displacing the movable part between said positions a resistance has to be overcome caused by the relative movements of the elastic member and the abutment. The said abutment may be formed either on the movable part or on the stationary part or parts. In the former case the elastic member is held fast by the stationary part or parts and in the latter case the same is brought to partake in the movement of the movable part.

According to a preferred form of embodiment of the invention the elastic device consists of a ring shaped spiral spring located in a recess either in the movable part or in or between the stationary parts. In order to make the spring more durable it is convenient to arrange a number of cylindrical sleeves on the same which are adapted to roll on the conical surfaces when the movable part is displaced. The elastic device may also consist of a number of rollers held together by spring portions.

Two forms of embodiment are illustrated on the accompanying drawings. Figure 1 is a longitudinal section through one form.

Fig. 2 shows a part of Fig. 1 in section with the different members of the clutch in another position. Fig. 3 shows in longitudinal section another form of embodiment, and Fig. 4 shows a detail.

1 is a conical coupling member supported by the stationary bearing block 1ª, and 2 is the movable clutch member connected with the pulley 3 and which can be displaced in the longitudinal direction of the shaft 5 by means of the lever 12. Fastened on said shaft is a conical coupling member 4 which thus rotates with the shaft. 6 is a sleeve keyed on the shaft and having at its inner end a conical portion 10. The conical portion 10 abuts against a conical portion 9 formed on the stationary coupling member 1. These two cones form together an abutment.

In the movable member 2 there is an annular groove 7 in which the elastic member 8 is located. According to Fig. 1 this member consists of a ring shaped spiral spring 8.

In the position according to Fig. 1 the spring 8 rests on the surface of the cone 9 thus forcing the movable clutch member 2 on to the stationary coupling member 1 in which position the pulley 3 is disconnected from the shaft and supported by the stationary coupling member 1. If the pulley is to be connected with the shaft the movable clutch member 2 is by means of the lever 12 displaced (to the right in the figure) so that the coupling surface of the same is connected with the coupling cone 4. Thereby the spring 8 is forced, on being extended, over the abutment to the conical surface 10 in which position it maintains the movable member 2 pressed against the coupling cone 4. On displacing the member 2 a relatively great resistance has thus to be overcome when the spring passes from one surface to the other.

The movable clutch member 2 is thus forced by the spring to occupy either of its coupling positions and is locked by the same in said positions. No other means for locking the same is required.

According to Fig. 3 the conical surfaces are formed on the movable clutch member 2 and the groove 7 for the spring 8 is located in one of the stationary clutch portions or between the same. The mode of action is here the same as in Figs. 1 and 2 with the exception that the spring is compressed instead of extended when the position of the movable member 2 is shifted.

In order to make the spring more durable it is convenient to use a number of rollers 11 which are held together by means of springs 8ª as is shown in Fig. 4. In this case it is the rollers that are rolling on the conical surfaces and the springs never will come in contact with the same.

Having now fully described and ascertained my invention, what I claim as new and desire to secure by Letters Patent is:

1. The combination with a shaft, of a fixed clutch member surrounding the shaft and rotatable therewith, a movable clutch member surrounding the shaft and disconnected therefrom, an abutment having oppositely inclined surfaces forming an annular ridge surrounding the shaft, and a resilient ring coöperating with said inclined surfaces for holding the clutch members in coupled and uncoupled positions, one of the inclined surfaces being adapted to bear against the ring and hold the same out of contact with any moving part when the clutch members are in uncoupled position and the other inclined surface being adapted to bear against the ring and hold the same in contact with a movable part when the clutch members are in coupled position.

2. The combination with a shaft, of a fixed clutch member rigidly secured to an abutment member having an inclined surface, an axially movable clutch member coöperating with the other clutch member and having an annular recess, a stationary abutment member bearing against the first abutment member and having an oppositely inclined surface, said inclined surfaces forming a ridge, and an elastic ring located in said recess and coöperating with said inclined surfaces for holding the clutch members in coupled and uncoupled position.

3. The combination with a rotatable shaft, of a sleeve fixed to the shaft, and provided with an abutment having an inclined surface, a fixed clutch member rigidly connected with said sleeve, a stationary member having an abutment bearing against the first abutment and having a surface oppositely inclined to the inclined surface of the first abutment, an axially movable clutch member coöperating with the fixed clutch member and provided with an interior annular recess, and an elastic ring located in said recess and coöperating with said inclined surfaces for holding the clutch members in coupled and uncoupled positions.

4. In a combination as called for by claim 1, a resilient ring including a curved coiled spring.

5. In a combination as called for by claim 1, a resilient ring comprising spaced rollers having curved coiled springs located between the same.

6. The combination with a rotatable shaft, of a sleeve fixed to said shaft and including an abutment having an inclined surface, a fixed clutch member rigidly secured to said sleeve, a stationary member surrounding said shaft and having an abutment bearing against the first abutment and provided with an oppositely inclined surface, an axially movable clutch member freely mounted on said stationary member and coöperating with the fixed clutch member, said movable clutch member having an interior annular groove, and a ring shaped spiral spring located in said recess and coöperating with said inclined surfaces for holding the clutch members in coupled and uncoupled positions.

In testimony whereof I have affixed my signature in presence of two witnesses.

KLAS HERMAN JOHANSSON.

Witnesses:
ERIC BASKARO,
OLOF SALCZ.